(12) United States Patent
Guen (10) Patent No.: US 9,893,346 B2
(45) Date of Patent: Feb. 13, 2018

(54) RECHARGEABLE BATTERY HAVING SHORT-CIRCUIT MEMBER

(71) Applicant: SAMSUNG SDI CO., LTD., Yongin-si, Gyeonggi-do (KR)

(72) Inventor: Min-Hyung Guen, Yongin-si (KR)

(73) Assignee: SAMSUNG SDI CO., LTD., Yongin-Si, Gyeonggi-Do (KR)

(*) Notice: Subject to any disclaimer, the term of this patent is extended or adjusted under 35 U.S.C. 154(b) by 310 days.

(21) Appl. No.: 14/868,416

(22) Filed: Sep. 29, 2015

(65) Prior Publication Data

US 2016/0276648 A1    Sep. 22, 2016

(30) Foreign Application Priority Data

Mar. 16, 2015  (KR) .................. 10-2015-0036216

(51) Int. Cl.
*H01M 2/34* (2006.01)
*H01M 2/04* (2006.01)
*H01M 2/12* (2006.01)
*H01M 2/20* (2006.01)
*H01M 10/04* (2006.01)
*H01M 2/30* (2006.01)

(52) U.S. Cl.
CPC ......... *H01M 2/345* (2013.01); *H01M 2/0473* (2013.01); *H01M 2/1252* (2013.01); *H01M 2/206* (2013.01); *H01M 2/30* (2013.01); *H01M 10/0431* (2013.01); *H01M 2200/103* (2013.01); *H01M 2200/20* (2013.01)

(58) Field of Classification Search
CPC ............... H01M 2/30; H01M 2200/20; H01M 2200/103
See application file for complete search history.

(56) References Cited

U.S. PATENT DOCUMENTS

| 9,768,436 B2* | 9/2017 | Guen | H01M 2/345 |
| 2012/0183818 A1* | 7/2012 | Byun | H01M 2/0473 429/61 |
| 2012/0315515 A1* | 12/2012 | Guen | H01M 2/0473 429/56 |
| 2012/0315516 A1* | 12/2012 | Kim | H01M 10/0525 429/61 |
| 2013/0330581 A1* | 12/2013 | Kim | H01M 2/345 429/61 |

(Continued)

*Primary Examiner* — Jeremiah Smith
(74) *Attorney, Agent, or Firm* — Lee & Morse, P.C.

(57) ABSTRACT

A rechargeable battery including an electrode assembly including a first electrode and a second electrode; a case in which the electrode assembly is accommodated, the case including an opening; a first terminal electrically coupled to the first electrode; a second terminal electrically coupled to the second electrode; a cap plate coupled to the opening, the cap plate including a short-circuit hole and being electrically coupled to the first electrode; a short-circuit member in the short-circuit hole, the short-circuit member electrically coupling the cap plate and the second terminal when deformed; and an upper cover including a first barrier wall covering the short-circuit hole, the first barrier wall protruding toward the short-circuit member, the first barrier wall including a first exhaust hole, and a top surface of the upper cover including an external hole connected to the first exhaust hole.

11 Claims, 5 Drawing Sheets

(56) References Cited

U.S. PATENT DOCUMENTS

2015/0048922 A1\* 2/2015 Kimura ................ H01H 37/767
 337/401
2015/0249241 A1\* 9/2015 Han ..................... H01M 2/345
 429/56
2016/0293930 A1\* 10/2016 Guen ................... H01M 2/345

\* cited by examiner

RECHARGEABLE BATTERY HAVING SHORT-CIRCUIT MEMBER

CROSS-REFERENCE TO RELATED APPLICATION

Korean Patent Application No. 10-2015-0036216, filed on Mar. 16, 2015, in the Korean Intellectual Property Office, and entitled: "Rechargeable Battery Having Short-Circuit Member," is incorporated by reference herein in its entirety.

BACKGROUND

1. Field

Embodiments relate to a rechargeable battery, for example, a rechargeable battery having a short-circuit member.

2. Description of the Related Art

A rechargeable battery differs from a primary battery in that it may be repeatedly charged and discharged, while the latter is incapable of being recharged. A low-capacity rechargeable battery may be used in small portable electronic devices such as mobile phones, notebook computers, and camcorders, and a high-capacity rechargeable battery may be used as a power source for driving a motor of a hybrid vehicle.

SUMMARY

Embodiments may be realized by providing a rechargeable battery, including an electrode assembly including a first electrode and a second electrode; a case in which the electrode assembly is accommodated, the case including an opening; a first terminal electrically coupled to the first electrode; a second terminal electrically coupled to the second electrode; a cap plate coupled to the opening, the cap plate including a short-circuit hole and being electrically coupled to the first electrode; a short-circuit member in the short-circuit hole, the short-circuit member electrically coupling the cap plate and the second terminal when deformed; and an upper cover including a first barrier wall covering the short-circuit hole, the first barrier wall protruding toward the short-circuit member, the first barrier wall including a first exhaust hole, and a top surface of the upper cover including an external hole connected to the first exhaust hole.

An exhaust pipe connected to the external hole may be under the external hole.

A second barrier wall enclosing the first barrier wall may be in the upper cover, and a second exhaust hole connected to the first exhaust hole may be in the second barrier wall.

The first exhaust hole may be closer to the cap plate than the second exhaust hole.

A short-circuit plate may be under the second terminal, and the short-circuit plate may include a connecting hole located above the short-circuit member.

Lower ends of the first and second barrier walls may contact the short-circuit plate, and a lower end of the exhaust pipe may be separated from the short-circuit plate.

The short-circuit plate may include a short-circuit protrusion, and the short-circuit protrusion may enclose the connecting hole.

An upper insulating member may insulate the short-circuit plate from the cap plate.

The upper cover may include an upper plate, and a side plate protruding toward the cap plate from a side end of the upper plate, and the upper cover may be in the upper insulating member.

The upper cover may have a curved surface connected to an inner surface of the first barrier wall, and the curved surface may be in an arc shape.

The short-circuit member may include a rim portion, and a recess portion curved convexly downward from the rim portion.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

Figure 1:
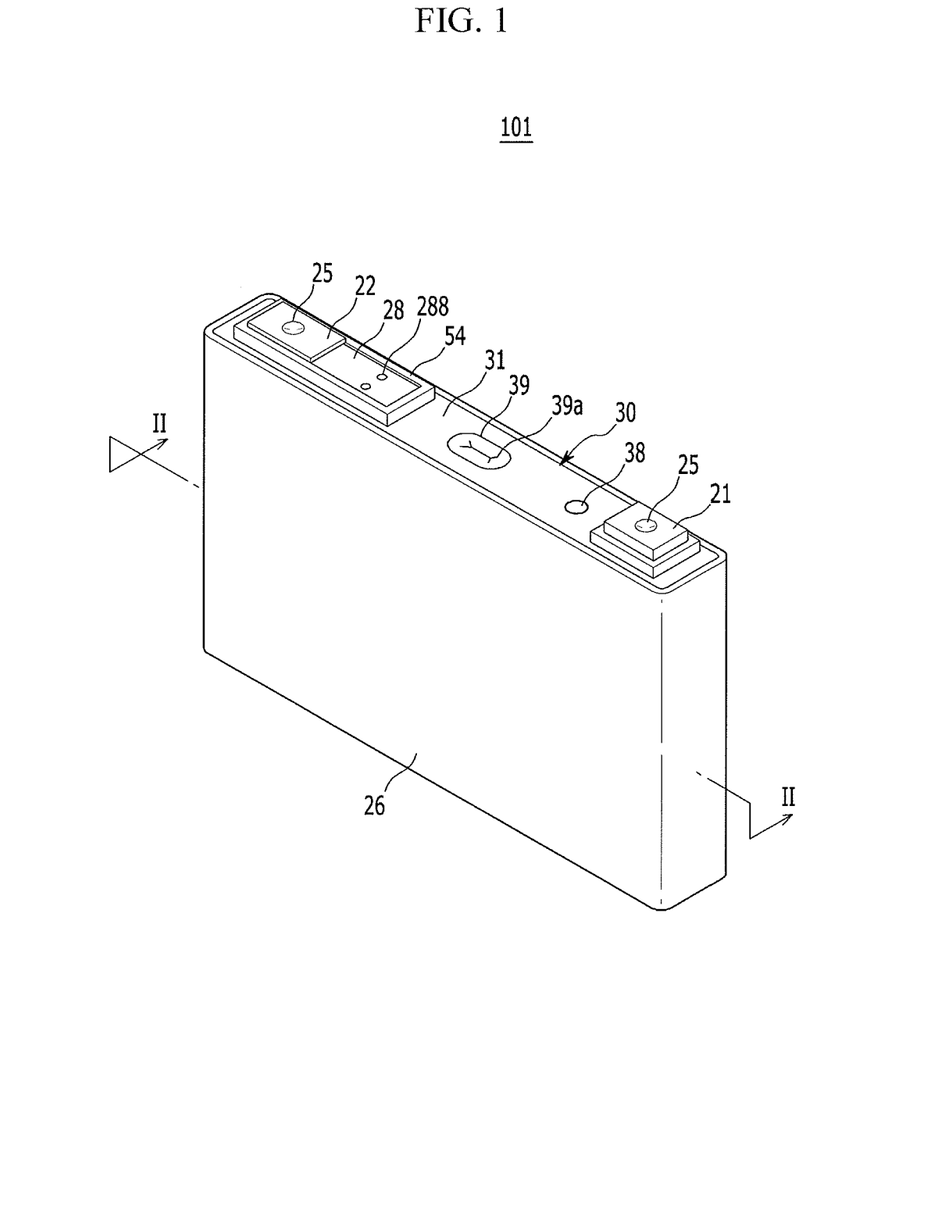
FIG. 1 illustrates a perspective view of a rechargeable battery according to an exemplary embodiment.
Figure 2:
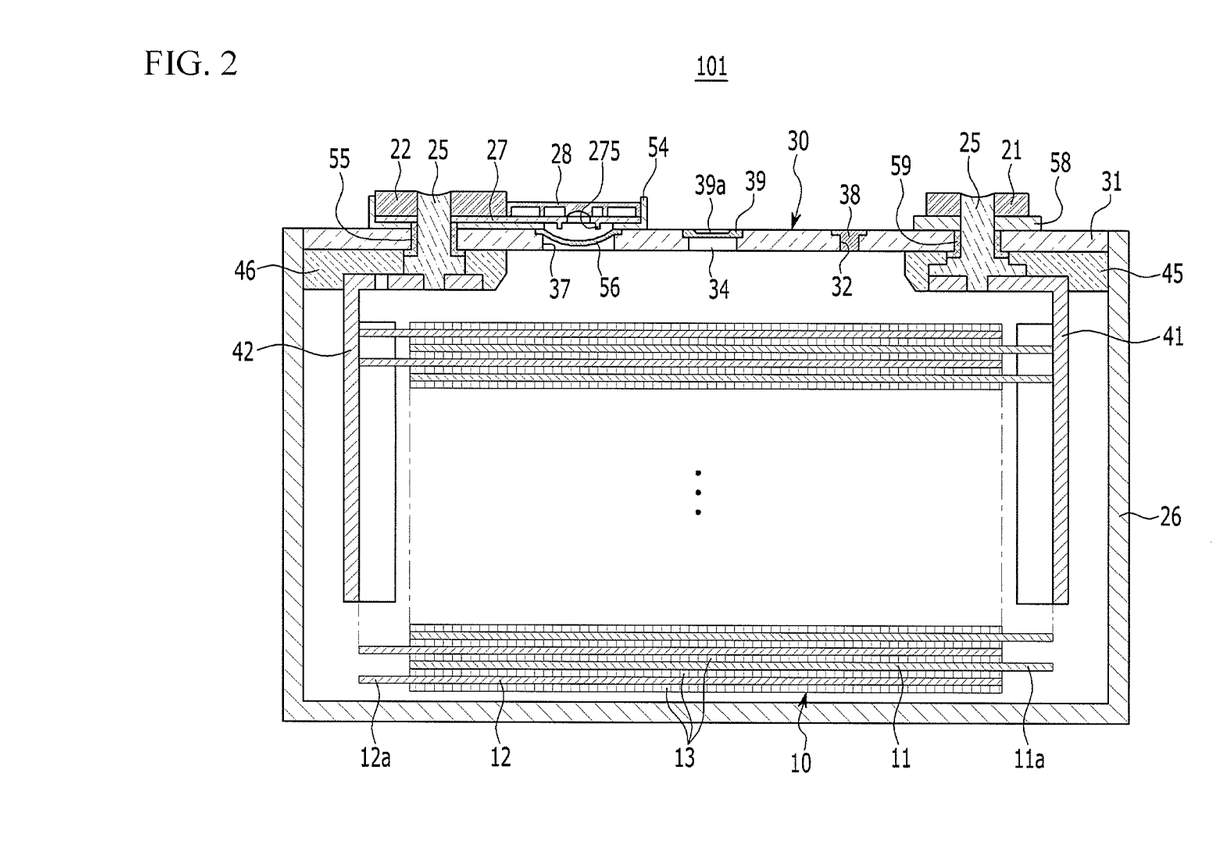
FIG. 2 illustrates a cross-sectional view of FIG. 1 taken along the line II-II.

FIG. 1 illustrates a perspective view of a rechargeable battery according to an exemplary embodiment, and FIG. 2 illustrates a cross-sectional view of FIG. 1 taken along the line II-II.

Referring to FIGS. 1 and 2, the rechargeable battery 101 according to the current exemplary embodiment may include an electrode assembly 10 wound by interposing a separator 13 between a positive electrode (first electrode) 11 and a negative electrode (second electrode) 12, a case 26 in which the electrode assembly 10 is accommodated, and a cap assembly 30 combined to, e.g., coupled to, an opening of the case 26.

The rechargeable battery 101 according to the current exemplary embodiment will be described as having a prismatic shape as being a lithium ion rechargeable battery. Embodiments may be applicable to various types of batteries such as, for example, a lithium polymer battery or a cylindrical battery.

The positive electrode 11 and the negative electrode 12 may include coated regions where an active material is coated on a current collector formed of a thin metal foil, and uncoated regions 11a and 12a where the active material is not coated thereon. The positive electrode uncoated region 11a may be formed at one lateral end of the positive electrode 11 along a length direction thereof, and the negative electrode uncoated region 12a may be formed at the other lateral end of the negative electrode 12 along a length direction thereof. The positive and negative electrodes 11 and 12 may be wound while interposing the separator 13 serving as an insulator therebetween.

In an embodiment, the electrode assembly 10 may have a layered structure in which the negative electrode 12 and the positive electrode 11, each of which may include a plurality of sheets, are layered while interposing the separator 13 between them.

The case 26 may have a substantially cuboid shape, one surface of which may be formed with an opening. The case 26 may be made of a metal such as, for example, aluminum or stainless steel.

The cap assembly 30 may include a cap plate 31 that may cover the opening of the case 26, a first terminal 21 that may protrude out of the cap plate 31 and may be electrically coupled to the positive electrode 11, and a second terminal 22 that may protrude out of the cap plate 31 and may be electrically coupled to the negative electrode 12.

The cap plate 31 may be formed as an elongated plate in one direction, and may be combined to, e.g., coupled to, the opening of the case 26. An electrolyte injection opening 32 through which an electrolyte solution may be injected may be formed in the cap plate 31, and a sealing cap 38 may be provided and may be inserted into the electrolyte injection opening 32. A vent hole 34 may be formed in the cap plate 31, and a vent plate 39 having a notch 39a, which may be ruptured by a predetermined pressure, may be provided in the vent hole 34.

The first and second terminals 21 and 22 may be provided to protrude above the cap plate 31. The first terminal 21 may be electrically coupled to the positive electrode 11 through a current collecting tab 41, and the second terminal 22 may be electrically coupled to the negative electrode 12 through a current collecting tab 42. In an embodiment, the first terminal 21 may be electrically connected to the negative electrode, and the second terminal 22 may be electrically connected to the positive electrode.

The first terminal 21 may have a rectangular plate shape. The first terminal 21 may be electrically coupled to the positive electrode 11 through a rivet terminal 25 joined to the current collecting tab 41. The rivet terminal 25 combined to, e.g., coupled to, the first terminal 21 may have the same structure as a rivet terminal 25 combined to, e.g., coupled to, the second terminal 22.

A sealing gasket 59 that may be provided to seal between the first terminal 21 and the cap plate 31 may be inserted into a hole penetrated by the rivet terminal 25, and a lower insulating member 45 may be provided under the cap plate 31 to insulate the first terminal 21 and the current collecting tab 41 from the cap plate 31.

A coupling plate 58 may be provided under the first terminal 21 to electrically couple the first terminal 21 and the cap plate 31. The coupling plate 58 may be disposed between the cap plate 31 and the first terminal 21, and the rivet terminal 25 may be provided to penetrate the coupling plate 58. In such a structure, the cap plate 31 may be electrically coupled to the first terminal 21.

Figure 3:
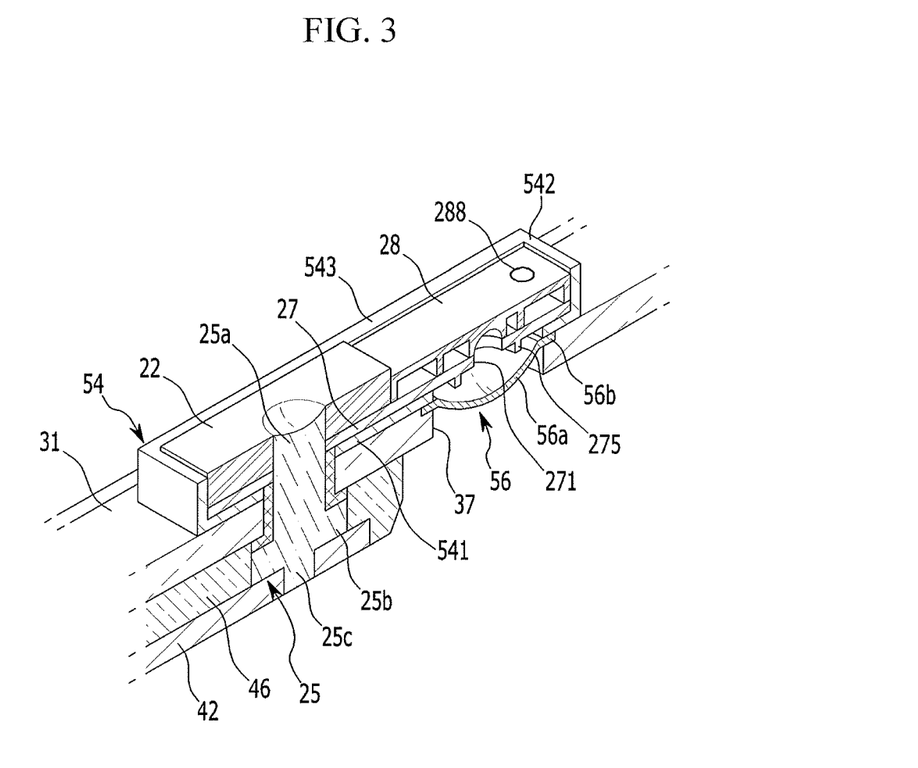
FIG. 3 illustrates a partial cut-away perspective view of the rechargeable battery according to an exemplary embodiment.

FIG. 3 illustrates a partial cut-away perspective view of the rechargeable battery according to an exemplary embodiment.

Referring to FIGS. 2 and 3, the second terminal 22 may have a rectangular plate shape. The second terminal 22 may be electrically coupled to the negative electrode 12 through the rivet terminal 25 joined to the current collecting tab 42. The rivet terminal 25 may penetrate the cap plate 31 and the second terminal 22, and an upper end of the rivet terminal 25 may be fixed to the second terminal 22.

A sealing gasket 55 that may be provided to seal between the second terminal 22 and the cap plate 31 may be inserted into a hole penetrated by the rivet terminal 25, and a lower insulating member 46 may be provided under the cap plate 31 to insulate the second terminal 22 and the current collecting tab 42 from the cap plate 31.

The cap assembly 30 may include a short-circuit member 56 that may short-circuit the positive electrode 11 and the negative electrode 12. The short-circuit member 56 may be electrically coupled to the cap plate 31, may be deformed when internal pressure of the rechargeable battery 101 increases, and then may be connected to the second terminal 22.

A short-circuit hole 37 may be formed in the cap plate 31, and the short-circuit member 56, which may be deformed and then may be connected to the second terminal 22 when the internal pressure of the rechargeable battery 101 increases, may be provided in the short-circuit hole 37. The short-circuit member 56 may include a recess portion 56a that may be curved to be downwardly convex, e.g., may be curved convexly downward, and a planer rim portion 56b that may extend along a circumference of the recess portion 56a.

A short-circuit plate 27 may be provided under the second terminal 22, and the short-circuit plate 27 may be disposed between the second terminal 22 and the cap plate 31. An upper insulating member 54 may be provided to insulate between the short-circuit plate 27 and the cap plate 31, e.g., to insulate the short-circuit plate 27 from the cap plate 31. The upper insulating member 54 may include a bottom 541 having a rectangular plate shape, and a side wall 542 protruding from the bottom 541.

The short-circuit plate 27 may have a quadrangular plate-like shape that may extend from below the second terminal 22 to above the short-circuit hole 37, and a connecting hole 271 may be formed above the short-circuit member 56 in the short-circuit plate 27. A short-circuit protrusion 275 may be formed in the short-circuit plate 27 to protrude towards the short-circuit member 56. The short-circuit protrusion 275 may be formed extend in a circumferential direction of the connecting hole 271, and may have a ring-shaped cross-section.

The short-circuit member 56 may be reversely deformed as the internal pressure increases, and the positively charged cap plate 31 and the negatively charged short-circuit plate 27 may be electrically coupled to discharge a charged current.

Figure 4:
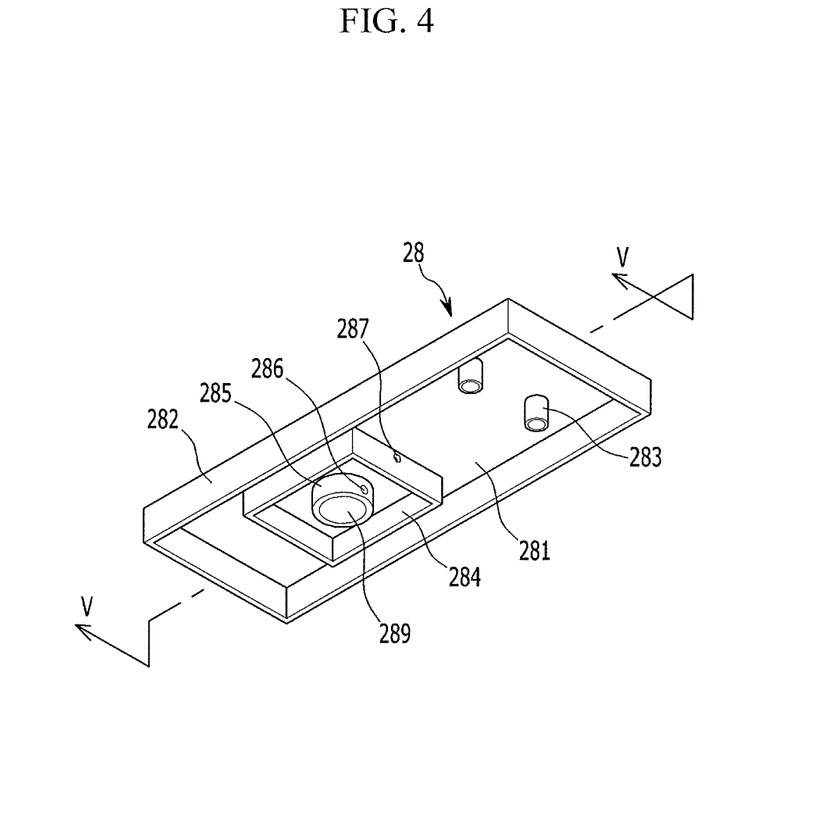
FIG. 4 illustrates a bottom perspective view of an upper cover according to an exemplary embodiment.
Figure 5:
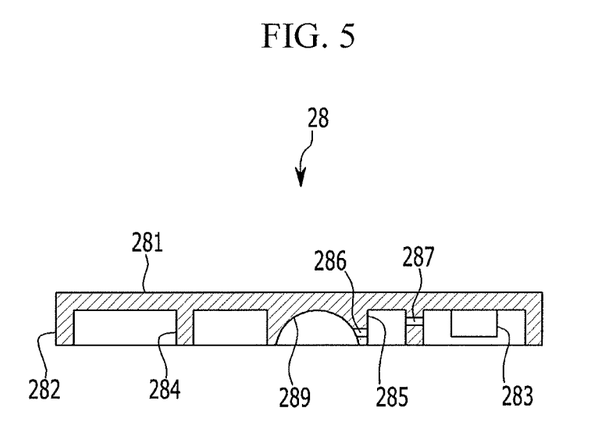
FIG. 5 illustrates a longitudinal sectional view of FIG. 4 taken along the line V-V.

FIG. 4 illustrates a bottom perspective view of an upper cover according to an exemplary embodiment, and FIG. 5 illustrates a longitudinal sectional view of FIG. 4 taken along the line V-V.

Referring to FIGS. 4 and 5, an upper cover 28 may be provided above the short-circuit plate 27 to cover the short-circuit hole 37. The upper cover 28 may be disposed adjacent to the second terminal 22, and may be made of a polymer having an insulating property. The upper cover 28 may be fitted into the upper insulating member 54 to be combined thereto, e.g., the upper cover 28 may be fitted into and coupled to the upper insulating member 54, and may prevent foreign materials from contacting the short-circuit member 56.

The upper cover 28 may include an upper plate 281 that may be formed from a rectangular plate, and a side plate 282 that may protrude toward the cap plate 31 from a side end of the upper plate 281 to be inserted into the upper insulating member 54, e.g., the upper cover 28 may be in the upper insulating member. An external hole 288 may be formed in the upper plate 281, and an exhaust pipe 283 may be provided towards the cap plate 31 and may be connected to the external hole 288. A plurality of external holes 288 may be formed in the upper plate, and the exhaust pipe 283 may be provided to be connected to each of the external holes 288. A lower end of the exhaust pipe 283 may be separated from the short-circuit plate 27.

A first barrier wall 285 having a ring-shaped cross-section may be formed inside of the side plate 282 to protrude toward the cap plate 31. The first barrier wall 285 may have a ring-shaped cross-section, and a lower end of the first barrier wall 285 may contact the short-circuit plate 27.

A first exhaust hole 286 may be formed in the first barrier wall 285 to penetrate the first barrier wall 285 in a thickness direction thereof. One or more first exhaust holes 286 may be formed in the first barrier wall 285. The upper cover 28 may have a curved surface 289 that may be connected to an inner surface of the first barrier wall 285 and may be curved in an arc shape, e.g., the curved surface 289 may be in an arc shape. The curved surface 289 may form a dome-shaped internal space by connecting to the first barrier wall 285.

A second barrier wall 284 may be formed in the upper cover 28 to enclose the first barrier wall 285, and a second exhaust hole 287 may be formed in the second barrier wall 284 to be connected to the first exhaust hole 286. The second barrier wall 284 may have a cross-section of a square loop shape, and a lower end of the second barrier wall 284 may contact the short-circuit plate 27. The first exhaust hole 286 may be disposed closer to the cap plate than the second exhaust hole 287, and the second exhaust hole 287 may be located above the first exhaust hole 286. When the outer second exhaust hole 287 is located above the first exhaust hole 286, internal gas may be easily discharged and external foreign materials may not easily penetrate inside the barrier walls.

When the internal pressure of the rechargeable battery 101 increases, the short-circuit member 56 may be deformed to be upwardly convex, and a space above the short-circuit member 56 may decrease as the short-circuit member 56 is elevated upward. The pressure above the short-circuit member 56 may increase, and the short-circuit member 56 may not be further elevated. However, according to the present exemplary embodiment, since the short-circuit member 56 is elevated upward, the gas may be discharged through the first exhaust hole 286, the second exhaust hole 287, and the external hole 288, and the pressure above the short-circuit member 56 may be decreased.

By way of summation and review, a high power rechargeable battery may use a non-aqueous electrolyte and may have high energy density. The high power rechargeable battery may include a large-capacity rechargeable battery in which a plurality of rechargeable batteries may be connected in series, and the high power rechargeable battery may be used as a power source for driving a motor of a device requiring a large amount of electric power, for example, an electric vehicle.

A high-capacity rechargeable battery may include a plurality of rechargeable batteries connected in series, and the rechargeable battery may have, for example, a cylindrical shape or a prismatic shape.

Such a rechargeable battery may require a safety apparatus that may be capable of preventing overheating and ensuring safety when overcharged.

Provided is a rechargeable battery that may have improved safety.

According to an exemplary embodiment, barrier walls and exhaust holes may be formed, and a short-circuit member may be more easily deformed when an internal pressure of a rechargeable battery increases.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including a first electrode and a second electrode;
   a case in which the electrode assembly is accommodated, the case including an opening;
   a first terminal electrically coupled to the first electrode;
   a second terminal electrically coupled to the second electrode;
   a cap plate coupled to the opening, the cap plate including a short-circuit hole and being electrically coupled to the first electrode;
   a short-circuit member in the short-circuit hole, the short-circuit member electrically coupling the cap plate and the second terminal when deformed; and
   an upper cover including a first barrier wall covering the short-circuit hole, the first barrier wall protruding toward the short-circuit member, the first barrier wall including a first exhaust hole, and a top surface of the upper cover including an external hole connected to the first exhaust hole.

2. The rechargeable battery as claimed in claim 1, wherein an exhaust pipe connected to the external hole is under the external hole.

3. The rechargeable battery as claimed in claim 2, wherein:
   a second barrier wall enclosing the first barrier wall is in the upper cover, and
   a second exhaust hole connected to the first exhaust hole is in the second barrier wall.

4. The rechargeable battery as claimed in claim 3, wherein the first exhaust hole is closer to the cap plate than the second exhaust hole.

5. The rechargeable battery as claimed in claim 3, wherein:
   a short-circuit plate is under the second terminal, and
   the short-circuit plate includes a connecting hole located above the short-circuit member.

6. The rechargeable battery as claimed in claim 5, wherein:
   lower ends of the first and second barrier walls contact the short-circuit plate, and
   a lower end of the exhaust pipe is separated from the short-circuit plate.

7. The rechargeable battery as claimed in claim 5, wherein:
   the short-circuit plate includes a short-circuit protrusion, and
   the short-circuit protrusion encloses the connecting hole.

8. The rechargeable battery as claimed in claim 5, wherein an upper insulating member insulates the short-circuit plate from the cap plate.

9. The rechargeable battery as claimed in claim 8, wherein:
   the upper cover includes:
      an upper plate, and
      a side plate protruding toward the cap plate from a side end of the upper plate, and
   the upper cover is in the upper insulating member.

10. The rechargeable battery as claimed in claim 1, wherein:
   the upper cover has a curved surface connected to an inner surface of the first barrier wall, and
   the curved surface is in an arc shape.

11. The rechargeable battery as claimed in claim 1, wherein the short-circuit member includes:
   a rim portion, and
   a recess portion curved convexly downward from the rim portion.

\* \* \* \* \*